(12) United States Patent
Chikamori et al.

(10) Patent No.: US 11,970,159 B2
(45) Date of Patent: Apr. 30, 2024

(54) VEHICLE CONTROL SYSTEM

(71) Applicant: HONDA MOTOR CO., LTD., Tokyo (JP)

(72) Inventors: Hidetoshi Chikamori, Saitama (JP); Kazumasa Nakamura, Saitama (JP); Hitoshi Konishi, Saitama (JP); Takuji Harayama, Saitama (JP); Tomoaki Masakawa, Tokyo (JP); Naofumi Aso, Saitama (JP); Ryo Matsuzawa, Tokyo (JP); Zhaoqi Wang, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 17/573,136

(22) Filed: Jan. 11, 2022

(65) Prior Publication Data

US 2022/0219683 A1 Jul. 14, 2022

(30) Foreign Application Priority Data

Jan. 12, 2021 (JP) ................. 2021-002846

(51) Int. Cl.
*B60W 30/09* (2012.01)
*B60W 30/18* (2012.01)
(Continued)

(52) U.S. Cl.
CPC ...... *B60W 30/09* (2013.01); *B60W 30/18159* (2020.02); *B60W 50/14* (2013.01);
(Continued)

(58) Field of Classification Search
CPC .......... B60W 30/09; B60W 30/18159; B60W 50/14; B60W 60/0027; B60W 2540/20;
(Continued)

(56) References Cited

U.S. PATENT DOCUMENTS

2015/0032362 A1* 1/2015 Goudy ................. G08G 1/162
                                                                          701/301
2017/0137025 A1    5/2017 Muto et al.
(Continued)

FOREIGN PATENT DOCUMENTS

JP    2003099896 A  *  4/2003
JP    2003099896 A     4/2003
(Continued)

OTHER PUBLICATIONS

Machine translation of WO-2018216216125-A1 downloaded from Espacenet (Year: 2023).*
(Continued)

*Primary Examiner* — Peter D Nolan
*Assistant Examiner* — Tanya C Sienko
(74) *Attorney, Agent, or Firm* — Armstrong Teasdale LLP

(57) ABSTRACT

Provided is a vehicle control system for avoiding a collection between a right-turning vehicle and a straight-through vehicle without decreasing comfort for an occupant. In the system, a first vehicle V1 and a second vehicle V2 retain high-precision map data for identifying a traveling lane. When the first vehicle V1 traveling in an autonomous driving mode intends to turn right from a right turn lane at an intersection ahead based on the high-precision map data, the first vehicle V1 transmits a right turn notification indicating the intention to turn right to nearby vehicles using vehicle-to-vehicle communications. When the second vehicle V2 traveling in an autonomous driving mode intends to travel straight at an intersection ahead, the second vehicle V2 recognizes a right-turning vehicle in an oncoming lane at the intersection upon receiving the right turn notification from the right-turning vehicle, and performs a predetermined control for collision avoidance.

7 Claims, 7 Drawing Sheets

(51) Int. Cl.
*B60W 50/14* (2020.01)
*B60W 60/00* (2020.01)

(52) U.S. Cl.
CPC ..... *B60W 60/0027* (2020.02); *B60W 2540/20* (2013.01); *B60W 2552/05* (2020.02); *B60W 2552/10* (2020.02); *B60W 2554/4041* (2020.02); *B60W 2554/4044* (2020.02); *B60W 2554/4045* (2020.02); *B60W 2556/40* (2020.02); *B60W 2556/65* (2020.02)

(58) Field of Classification Search
CPC ......... B60W 2552/05; B60W 2552/10; B60W 2554/4041; B60W 2554/4044; B60W 2554/4045; B60W 2556/40; B60W 2556/65
See application file for complete search history.

(56) References Cited

U.S. PATENT DOCUMENTS

| | | | | |
|---|---|---|---|---|
| 2017/0217430 | A1* | 8/2017 | Sherony | B60W 10/04 |
| 2018/0326979 | A1* | 11/2018 | Tsuruoka | B60W 30/0956 |
| 2019/0073903 | A1* | 3/2019 | Baba | B60W 30/09 |
| 2020/0111366 | A1 | 4/2020 | Nanri et al. | |
| 2021/0082296 | A1* | 3/2021 | Jacobus | H04W 4/026 |
| 2023/0286478 | A1* | 9/2023 | Inami | B60T 8/58 |
| | | | | 701/70 |

FOREIGN PATENT DOCUMENTS

| | | | | |
|---|---|---|---|---|
| JP | 2011065235 | A | 3/2011 | |
| JP | 2016021125 | A | 2/2016 | |
| WO | 2018216125 | A1 | 11/2018 | |
| WO | WO-2018216125 | A1 * | 11/2018 | ............ B60W 10/04 |

OTHER PUBLICATIONS

Machine translation of JP-2003099896-A downloaded from IP.com (Year: 2023).*

"Dynamic Intersections and Self-Driving Vehicles" by S. Aoki and R. Rajkumar. 2018 9th ACM/IEEE International Conference on Cyber-Physical Systems Apr. 11-13, 2018 (Year: 2018).*

Notice of Reasons for Refusal for Patent Application JP 2021-002846 dated Sep. 6, 2022; 10 pp.

* cited by examiner

*Fig.3*
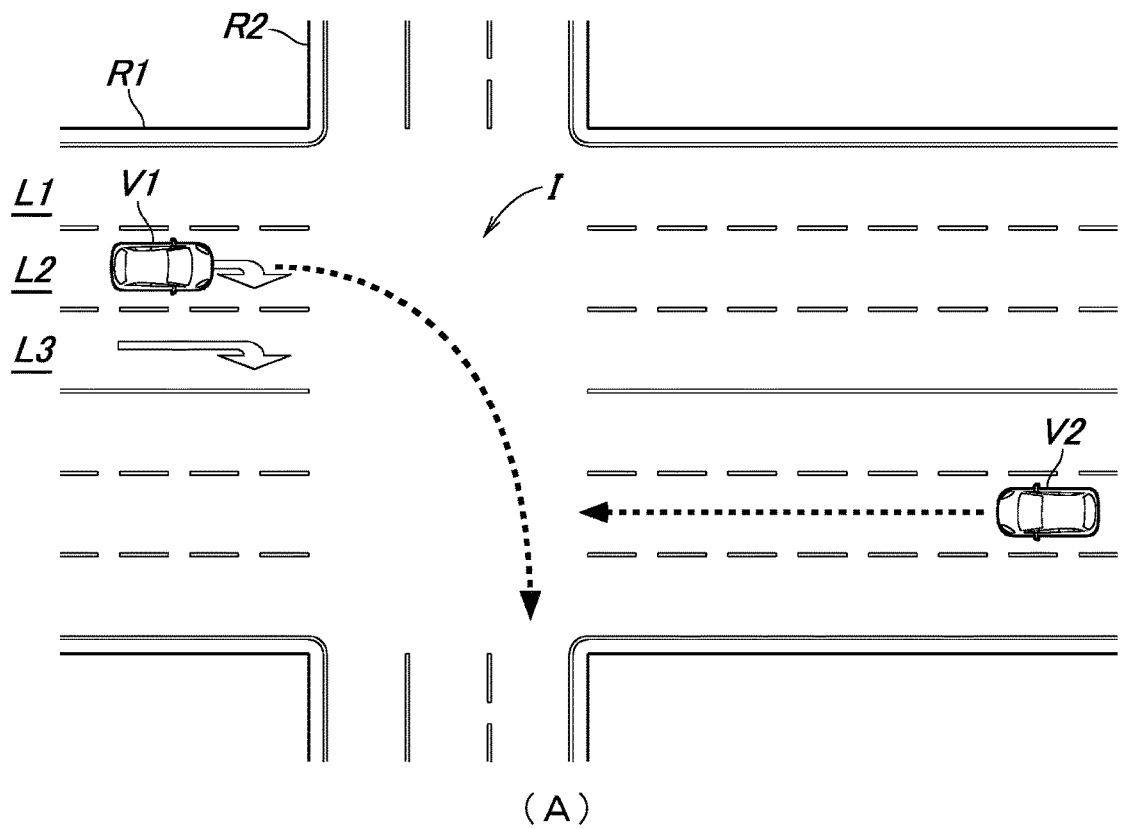
(A)
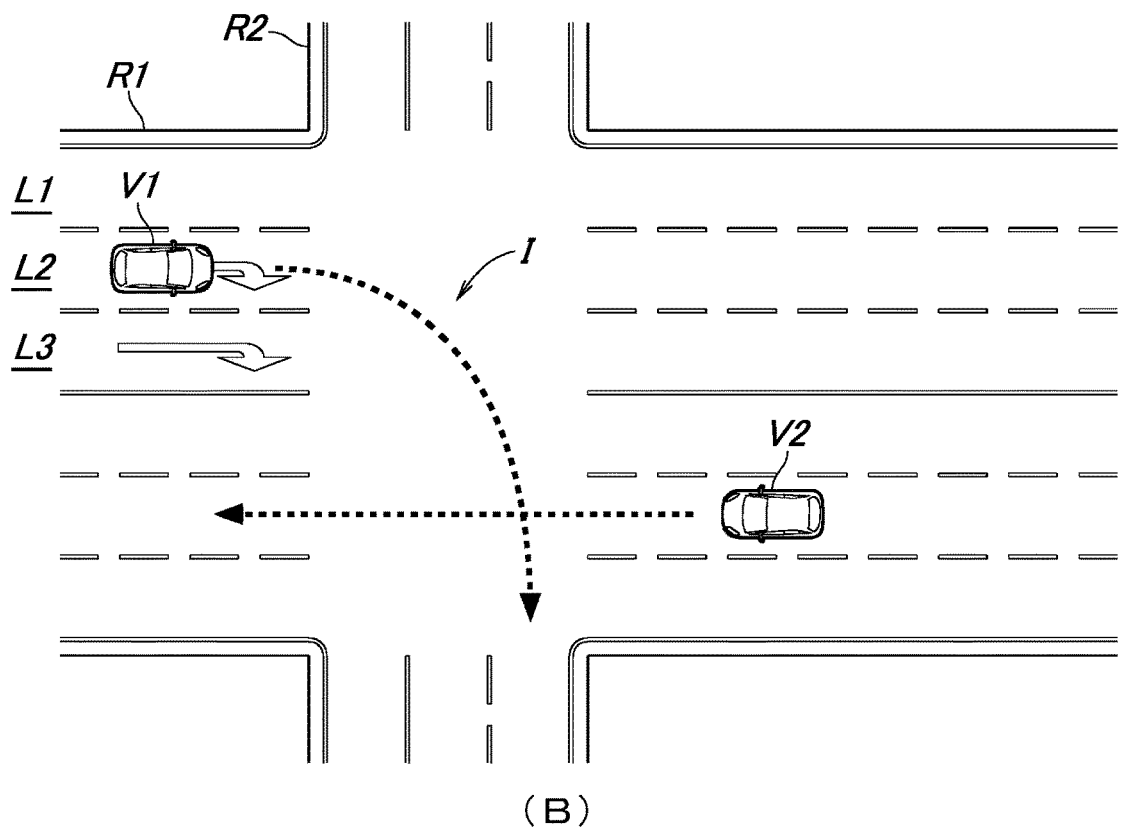
(B)

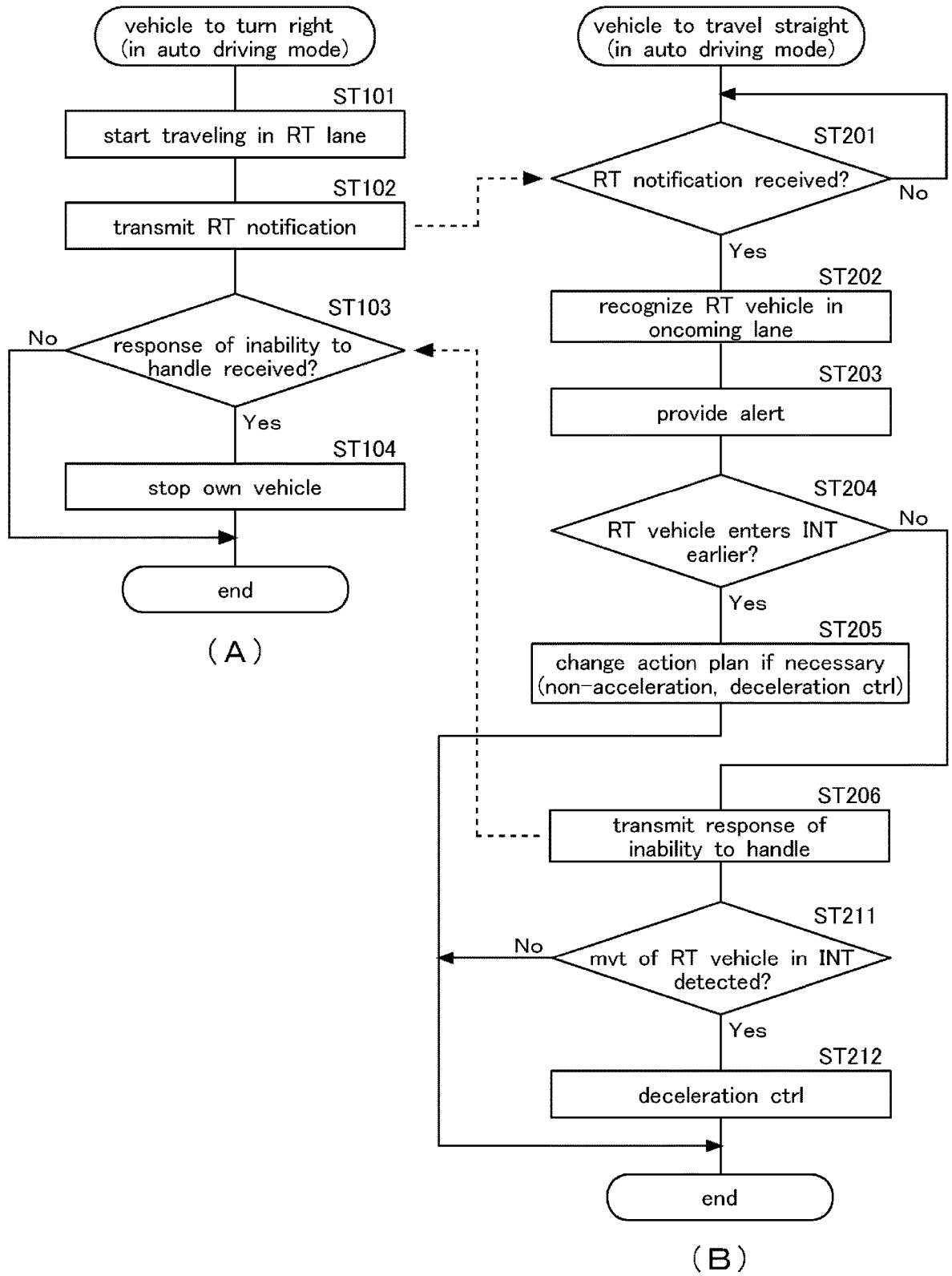

VEHICLE CONTROL SYSTEM

TECHNICAL FIELD

The present invention relates to a vehicle control system for avoiding a collision between a right-turning vehicle and a straight-through vehicle.

BACKGROUND ART

There is a need for technologies for preventing vehicle collision accidents at intersections to ensure safe and smooth traffic of vehicles at the intersections. A known technology for preventing a collision accident at such an intersection includes an apparatus for determining a risk of collision at an intersection in consideration of lane information; that is, information as to lanes provided in each road (see Patent Document 1). This apparatus of the prior art provides a risk notification to a vehicle at risk of collision.

PRIOR ART DOCUMENT(S)

Patent Document(s)

Patent Document 1: JP2016-021125A

SUMMARY OF THE INVENTION

Task to be Accomplished by the Invention

In the above-described prior art, the apparatus performs controls for collision avoidance when determining that there is a high risk of collision. In addition, the controls for collision avoidance includes causing a vehicle to activate a brake and stop, or providing an alert to a driver of the vehicle by using image display or voice. Moreover, the apparatus notifies a different vehicle about a risk of collision, to thereby provide an alert to the driver of the different vehicle.

However, in the case of a collision accident at an intersection, in particular, a collision accident between a right-turning vehicle and a straight-through vehicle, a slight forward movement of a right-turning vehicle sharply increases the risk of collision. Thus, such a right-turning vehicle at an intersection can cause a problem of forcing a straight-through vehicle to make a sudden stop or an abrupt slowdown or to blare the vehicle's horn for alert, which puts a lot of strain on an occupant of the straight-through vehicle, leading to a decrease in comfort for the occupant.

The present invention has been made in view of the problem of the prior art, and a primary object of the present invention is to provide a vehicle control system which can avoid a collision between a right-turning vehicle and a straight-through vehicle without operations or controls that decrease comfort for an occupant.

Means to Accomplish the Task

A first aspect of the present invention provides a vehicle control system for avoiding a collision between a right-turning vehicle and a straight-through vehicle, wherein a first vehicle retains high-precision map data used to identify a lane in which the first vehicle is traveling, and wherein, when the first vehicle is in an autonomous driving mode and intends to travel in a right turn lane and turn right at an intersection ahead based on the high-precision map data, the first vehicle transmits a right turn notification indicating the intention to turn right, to one or more nearby vehicles using vehicle-to-vehicle communications; and wherein a second vehicle retains high-precision map data used to identify a lane in which the second vehicle is traveling, and wherein, when the second vehicle is in an autonomous driving mode and intends to travel straight at an intersection ahead, the second vehicle recognizes a different vehicle in an oncoming lane at the intersection as a right-turning vehicle upon receiving the right turn notification from the different vehicle, and performs a predetermined control for collision avoidance with the right-turning vehicle.

This configuration enables the second vehicle (straight-through vehicle) to accurately and quickly recognize that the first vehicle (right-turning vehicle) intends to turn right, so that the second vehicle can perform proper control at an early timing. As a result, a collision accident between a right-turning vehicle and a straight-through vehicle can be prevented without causing the straight-through vehicle to perform operations and controls that decrease comfort for an occupant (such as making a sudden stop or an abrupt slowdown).

A second aspect of the present invention provides a vehicle control system for avoiding a collision between a right-turning vehicle and a straight-through vehicle, wherein a first vehicle retains high-precision map data used to identify a lane in which the first vehicle is traveling, and wherein, when the first vehicle is in an autonomous driving mode and intends to travel in a right turn lane and turn right at an intersection ahead based on the high-precision map data, the first vehicle transmits a right turn notification indicating the intention to turn right, to one or more nearby vehicles using vehicle-to-vehicle communications; and wherein, when a second vehicle is in a manual driving mode and receives the right turn notification from a different vehicle, the second vehicle performs a predetermined control for collision avoidance by notifying a driver of the second vehicle that there is the different vehicle in an oncoming lane intending to turn right at an intersection ahead.

This configuration enables the second vehicle (straight-through vehicle) to notify a driver that a different vehicle in an oncoming lane at the intersection ahead intends to turn right, so that the second vehicle can cause the driver to perform a proper operation at an early timing. As a result, a collision accident between a right-turning vehicle and a straight-through vehicle can be prevented without causing the straight-through vehicle to perform operations and controls that decrease comfort for an occupant (such as blaring the vehicle's horn for alert).

A third aspect of the present invention provides a vehicle control system for avoiding a collision between a right-turning vehicle and a straight-through vehicle, wherein, when a first vehicle is in a manual driving mode and detects that a driver of the first vehicle operates a turn signal lever to give a right turn signal, the first vehicle transmits a right turn notification indicating the intention to turn right, to one or more nearby vehicles using vehicle-to-vehicle communications; and wherein a second vehicle retains high-precision map data used to identify a lane in which the second vehicle is traveling, and wherein, when the second vehicle is in an autonomous driving mode and intends to travel straight at an intersection ahead, the second vehicle recognizes a different vehicle in an oncoming lane at the intersection as a right-turning vehicle based on the right turn notification transmitted from the different vehicle and the high-precision map data, and performs a predetermined control for collision avoidance with the right-turning vehicle.

This configuration enables the second vehicle (straight-through vehicle) to accurately and quickly recognize that the first vehicle (right-turning vehicle) intends to turn right, so that the second vehicle can perform proper control at an early timing. As a result, a collision accident between a right-turning vehicle and a straight-through vehicle can be prevented without causing the straight-through vehicle to perform operations and controls that decrease comfort for an occupant (such as making a sudden stop or an abrupt slowdown).

In the first and second aspects, preferably, when there are multiple right turn lanes and the first vehicle intends to travel in a farthest right turn lane and turn right at an intersection ahead, the farthest right turn lane being one of the multiple right turn lanes which is farthest from the center of a road, the first vehicle transmits the right turn notification indicating the intention to turn right from the farthest right turn lane.

This configuration enables the second vehicle (straight-through vehicle) to be notified that the first vehicle intends to turn right from the farthest right turn lane. As a result, when being in the autonomous driving mode, the second vehicle can perform further proper control, and when being in the manual driving mode, the second vehicle can notify a driver that a different vehicle intends to turn right from the farthest right turn lane, thereby enabling the driver to perform a further proper operation.

In the third aspect, preferably, upon receiving the right turn notification, the second vehicle recognizes a different vehicle in a farthest oncoming lane as a right-turning vehicle based on the high-precision map data, the farthest oncoming lane being one of the oncoming lanes which is farthest from the center of a road, and performs the predetermined control for collision avoidance with the right-turning vehicle.

This configuration enables the second vehicle (straight-through vehicle) to recognize the first vehicle intends to turn right from the farthest right turn lane, so that the second vehicle can perform further proper control.

In the first and third aspects, preferably, in a case where the second vehicle recognizes a different vehicle in the oncoming lane at the intersection ahead as a right-turning vehicle and the second vehicle is expected to pass through the intersection before the right-turning vehicle, when detecting that the right-turning vehicle has moved in the intersection, the second vehicle performs the predetermined control for collision avoidance with the right-turning vehicle.

In this configuration, when the first vehicle (right-turning vehicle) moves in the intersection to increase the risk of collision, the second vehicle (straight-through vehicle) can perform a necessary control to avoid a collision.

In the first and third aspects, preferably, the second vehicle performs the predetermined control for collision avoidance by changing an action plan for autonomous driving of the second vehicle.

This configuration enables the second vehicle (straight-through vehicle) to change an action plan for autonomous driving of the second vehicle to avoid a collision. For example, only slight deceleration of a vehicle intending to travel straight can significantly reduce the risk of collision, leading to avoidance of a collision.

In the first to third aspects, preferably, the second vehicle performs a control for providing an alert to an occupant as the predetermined control for collision avoidance.

This configuration can provide an alert to an occupant of the second vehicle (straight-through vehicle) to notify the occupant that there is a right-turning vehicle and a risk of collision therewith. In this case, an alert can be provided by using image display, or voice or sound output.

Effect of the Invention

The above configurations enable a second vehicle (straight-through vehicle) to accurately and quickly recognize that a first vehicle (right-turning vehicle) intends to turn right, so that the second vehicle can perform proper control at an early timing. As a result, a collision accident between a right-turning vehicle and a straight-through vehicle can be prevented without causing the straight-through vehicle to perform operations and controls that decrease comfort for an occupant.

BRIEF DESCRIPTION OF THE DRAWINGS

FIG. 3 is a schematic diagram showing an example of a positional relationship between a vehicle intending to turn right and a vehicle intending to travel straight;

FIG. 7 is a flow chart showing an example of an operation procedure of a vehicle control system according to a second embodiment of the present invention.

DESCRIPTION OF THE PREFERRED EMBODIMENT(S)

Embodiments of the present invention will be described below with reference to the drawings.

Figure 1:
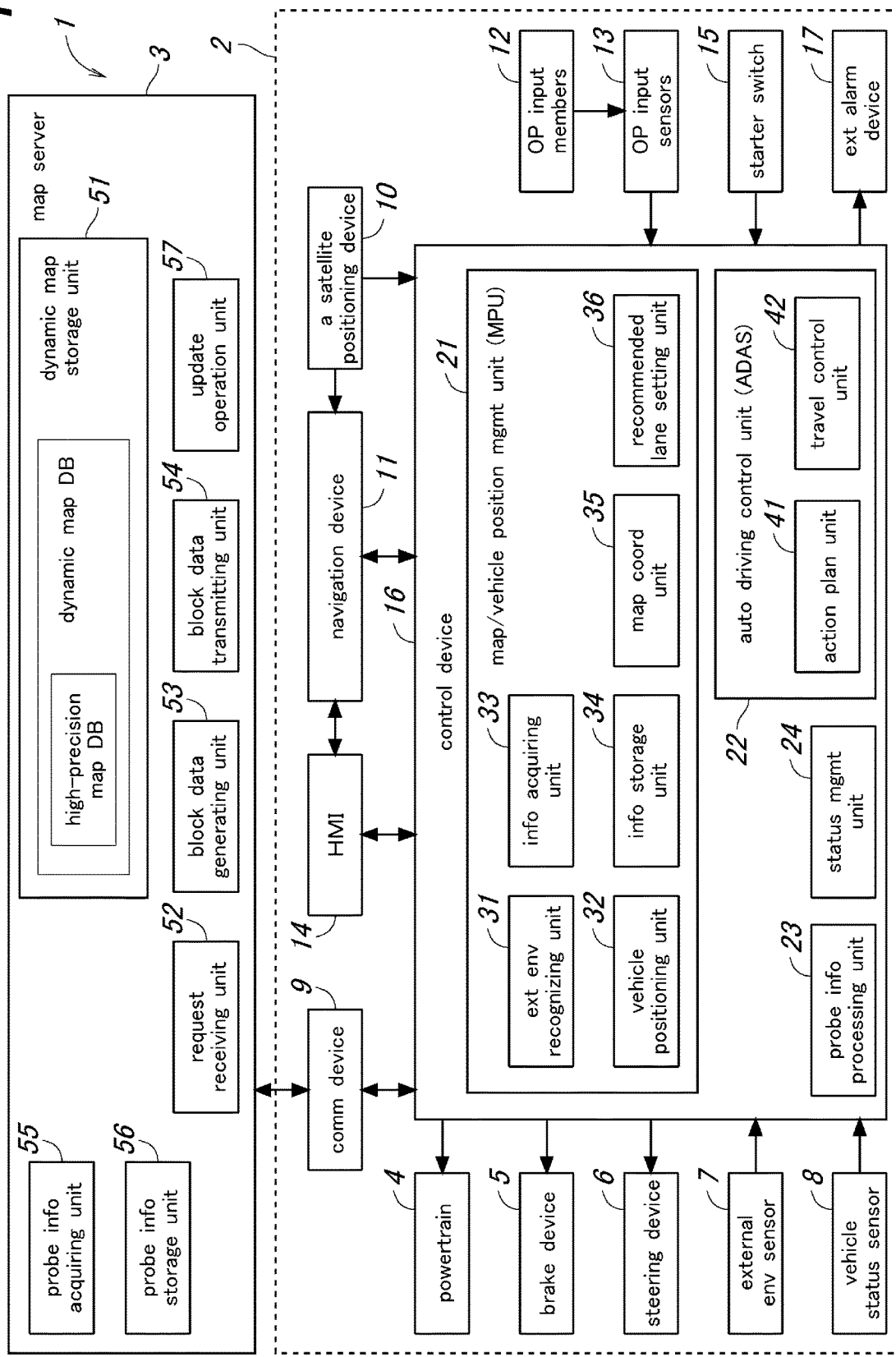
FIG. 1 is a block diagram showing a schematic configuration of a vehicle control system according to a first embodiment of the present invention.

FIG. 1 is a block diagram showing a schematic configuration of a vehicle control system 1 according to a first embodiment of the present invention. The vehicle control system 1 includes a vehicle system 2 mounted in a vehicle and a map server 3 connected to the vehicle system 2 via a network.

The vehicle system 2 includes a powertrain 4, a brake device 5, a steering device 6, an external environment sensor 7, vehicle status sensors 8, a communication device 9, a satellite positioning device 10, a navigation device 11, operation input members 12, and operation input sensors 13, an HMI 14 (human-machine interface), a starter switch 15, a control device 16, and an external alarm device 17. These in-vehicle devices and elements, which constitute part of the vehicle system 2, are connected to each other through a communication network such as CAN (Control Area Network).

The powertrain 4, which provides a driving force to a vehicle, is a power source such that an electric motor or an internal combustion engine. The brake device 5 applies a braking force to a vehicle. The steering device 6 changes the steering angle of the wheels.

The external environment sensor 7 detects an object outside the vehicle by using electromagnetic waves, sound waves, or light reflected from an object located around the vehicle, and may include a radar, a laser radar (lidar), a sonar, and an external camera. The vehicle status sensor 8 detects the status of the vehicle, and may include a vehicle speed sensor and IMUs (Inertial Measurement Unit) for detecting a direction, a gyro, an acceleration, and an inclination state.

The communication device 9 is what is called a TSU (Telematics Service Unit). The communication device 9 communicates with other vehicles, roadside units, and the map server 3. Although communication methods usable by the communication device 9 are not limited to specific communication methods, the communication device 9 may perform communications through WiFi (Registered Trademark) networks, mobile communication networks (mobile phone networks), and/or V2X communications (vehicle-to-vehicle communications, roadside-device-to-vehicle communications).

The satellite positioning device 10 measures the position of the vehicle and outputs the position data (latitude/longitude) of the vehicle by using a satellite positioning system such as Global Navigation Satellite Systems (GNSS).

The navigation device 11 receives data of a destination which an occupant enters by operating the HMI 14, and sets a route (driving path) from the current location of the vehicle to the destination. The navigation device 11 displays the route from the current location of the vehicle to the destination in a screen displayed on the HMI 14, and provides a driver with guidance about the route by using a visual indication displayed on the HMI 14 or voice at an appropriate time.

The operation input members 12 are operated by a driver to drive the vehicle, and may include a steering wheel, an accelerator pedal, a brake pedal, a shift lever, a winker lever, and a power button. The operation input sensors 13 detect operations which a driver performs on the operation input members 12 and may include an accelerator sensor, a steering angle sensor, a brake sensor, and a grip sensor. The starter switch 15 is a switch for activating the vehicle system 2.

The HMI 14 (Human Machine Interface) notifies an occupant(s) of various pieces of information, provides guidance to the occupant, and receives input operations performed by the occupant. The HMI 14 may include a display device (display) for indicating a navigation map on the screen, an input device such as a touch panel, a voice device (speaker) for outputting voice, and an autonomous driving selector switch for switching a driving mode between an autonomous driving mode and a manual operation mode.

The external alarm device 17 provides an alarm to a driver or a pedestrian outside the vehicle, and may include a winker (direction indicator).

The control device 16 includes a map/vehicle position management unit 21, an autonomous driving control unit 22, a probe information processing unit 23, and a status management unit 24. The control device 16 is an electronic control device (ECU) including a storage unit (such as ROM, RAM, HDD, or SSD) and a processor, and each functional unit of the control device 16 is implemented by the processor executing a program(s) stored in the storage unit. Each functional unit of the control device 16 may be composed of a single electronic control device or may be composed of a plurality of electronic control devices.

The map/vehicle position management unit 21 is what is called an MPU (Map Positioning Unit, high-precision vehicle positioning unit). The map/vehicle position management unit 21 includes an external environment recognizing unit 31, a vehicle positioning unit 32, an information acquiring unit 33, an information storage unit 34, a map coordination unit 35, and a recommended lane setting unit 36. The map/vehicle position management unit 21 includes a storage unit (such as ROM, RAM, HDD, or SSD) and a processor, and each functional unit of the map/vehicle position management unit 21 is implemented by the processor and programs stored in the storage unit.

The external environment recognizing unit 31 recognizes obstacles (such as guardrails, utility poles, vehicles, and pedestrians) located around the vehicle, lane markings on the road surface, road side ends based on detection results of the external environment sensor 7.

Based on the position data (latitude and longitude) of the vehicle acquired by the satellite positioning device 10, the vehicle positioning unit 32 identifies the current position of the vehicle in the high-precision map by combining the recognition result of the external environment recognizing unit 31 with the high-precision map in a coordinated fashion. The vehicle positioning unit 32 may identify the current position of the vehicle in the map by utilizing an autonomous navigation method based on a combination of the positioning result acquired by a satellite positioning system such as a GNSS system and the detection result of the IMU as the vehicle status sensor 8.

The information storage unit 34 holds various types of information required for autonomous driving of a vehicle. The information stored in the information storage unit 34 includes information constituting a dynamic map database (dynamic map DB).

Data of the dynamic map includes a combination of information classified into four layers; that is, static information, quasi-static information, quasi-dynamic information, and dynamic information. The static information is high-precision map data, which forms a high-precision map DB, including road surface information, lane information, and information on three-dimensional structures. Quasi-static information includes traffic regulation schedule information, road construction schedule information, wide area weather forecast information, and other related information. Semi-dynamic information includes accident information, road congestion information, traffic regulation information, road construction information, narrow area weather information, and other related information. Dynamic information includes real-time information such as information on vehicles and pedestrians on the road and information on signals.

The update frequencies of static information, quasi-static information, quasi-dynamic information, and dynamic information are different from each other. The dynamic information is updated, for example, once per second. The quasi-dynamic information is updated, for example, once a minute. The quasi-static information is updated, for example, once an hour. Static information is updated, for example, once a month.

The information acquiring unit 33 requests the latest data of a high-precision map to the map server 3 via the communication device 9 (TSU), to thereby acquire the high-precision map data transmitted from the map server 3 in response to the request. Specifically, the information acquiring unit 33 acquires the high-precision map data as a set of block data for predetermined block areas along the route of the vehicle based on the current position of the vehicle acquired by the vehicle positioning unit 32 and the route set by the navigation device 11.

The block data includes static information (high-precision map data) including information about lanes on each road along the route of the vehicle. When the high-precision map data stored in the information storage unit 34 is not the latest map data, the map server 3 delivers differential data between the stored map data and the latest high-precision map data to the control device, and the map/vehicle position management unit 21 performs a map updating operation to update the map data stored in the information storage unit 34 to the latest high-precision map data. The block data also includes quasi-static information such as traffic regulation information related to roads along the route and quasi-dynamic information such as road congestion information related to roads along the route.

The map coordination unit 35 performs a map coordination operation to replace a route in the navigation map (SD (Standard)-MAP) of the vehicle, the route being set by the navigation device 11, with a route in the high-precision map (HD (High Definition)-MAP).

The recommended lane setting unit 36 sets an optimum lane in each road section in the route along with the vehicle is to travel as a recommended lane, based on the route on the high-precision map acquired by the map coordination unit 35, and the quasi-dynamic information and the dynamic information included in the dynamic map data.

The autonomous driving control unit 22 is a control unit used in ADAS (Advanced Driver-Assistance Systems). The autonomous driving control unit 22 includes an action plan unit 41 and a travel control unit 42.

The action plan unit 41 creates an action plan for driving the vehicle along the route for the vehicle set by the navigation device 11. Specifically, the action plan unit 41 determines a sequence of necessary events (i.e., events required to drive the vehicle along the recommended lane without contacting obstacles), and based on those events, generates a target track on which the vehicle is to travel. The target track is a sequence of points at which the vehicle should passes in time series.

The events set by the action plan unit 41 include: a constant speed traveling event which causes the vehicle to travel in the same lane at a constant speed; a lane change event which causes the vehicle to change lanes so that the vehicle travels on the recommended lane; a merging event which causes the vehicle to follow a road merging with another one; a branching event which causes the vehicle to travel towards a desired direction at a branching point on the road; and an intersection event which causes the vehicle to travel at an intersection.

The travel control unit 42 controls the vehicle according to the action plan generated by the action plan unit 41. Specifically, the travel control unit 42 controls the powertrain 4, the brake device 5, and the steering device 6 so that the vehicle follows the target track.

The probe information processing unit 23 collects information on the driving condition of the vehicle at an appropriate time (for example, when a winker is operated or when a brake is operated) and stores the corrected information in a memory. The probe information processing unit 23 transmits information on the driving condition of the vehicle as probe information (travel history information) from the communication device 9 to the map server 3 at an appropriate time.

The probe information includes information records of the position and speed of the vehicle at each time. Moreover, the probe information includes information records identifying the traveling lane at each time. The probe information includes information records of the tilt of the roads acquired from the detection results of the vehicle status sensor 8 or other information. The probe information also includes congestion information acquired from the detection results of the vehicle status sensor 8 or other information. The probe information also includes road update information acquired from the detection results of the operation input sensors 13 and the external environment sensor 7.

The status management unit 24 switches a driving mode of the vehicle between a manual driving mode in which an occupant performs driving operations and an autonomous driving mode in which the vehicle autonomously travels. The driving mode can be switched between the manual driving mode and the autonomous driving mode in response to an occupant's operation. However, in an emergency, the control device switches the driving mode from the autonomous driving mode to the manual driving mode.

The map server 3 (server device) includes a dynamic map storage unit 51, a request receiving unit 52, a block data generating unit 53, a block data transmitting unit 54, and a probe information acquiring unit 55, a probe information storage unit 56, and an update operation unit 57. The map server 3 is a computer provided with a storage unit (such as ROM, RAM, HDD, or SSD.) and a processor, and each functional unit of the map server 3 is implemented by the processor and programs in the storage unit. The map server 3 includes a communication unit for communicating with the control device 16 via a network (such as the Internet or mobile communication network). A data center and an edge server may cooperate to implement these functions of the map server 3.

The dynamic map storage unit 51 stores data constituting a dynamic map DB. The dynamic map includes static information (high-precision map information), quasi-static information, quasi-dynamic information, and dynamic information.

The request receiving unit 52 receives a dynamic map transmission request from each vehicle. When the request receiving unit 52 receives a dynamic map transmission request, based on the planned route and the current position of the vehicle, the block data generating unit 53 extracts data, the data corresponding to a predetermined area around the target vehicle and including the planned route of the target vehicle, from the dynamic map storage unit 51 to thereby generate block data. The block data transmitting unit 54 transmits the block data generated by the block data generating unit 53 to the vehicle.

The probe information acquiring unit 55 acquires probe information transmitted from each vehicle as appropriate. The probe information storage unit 56 stores probe information acquired by the probe information acquiring unit 55.

The update operation unit 57 performs statistical processing operations on the probe information stored in the probe information storage unit 56, and updates the dynamic map.

Figure 2:
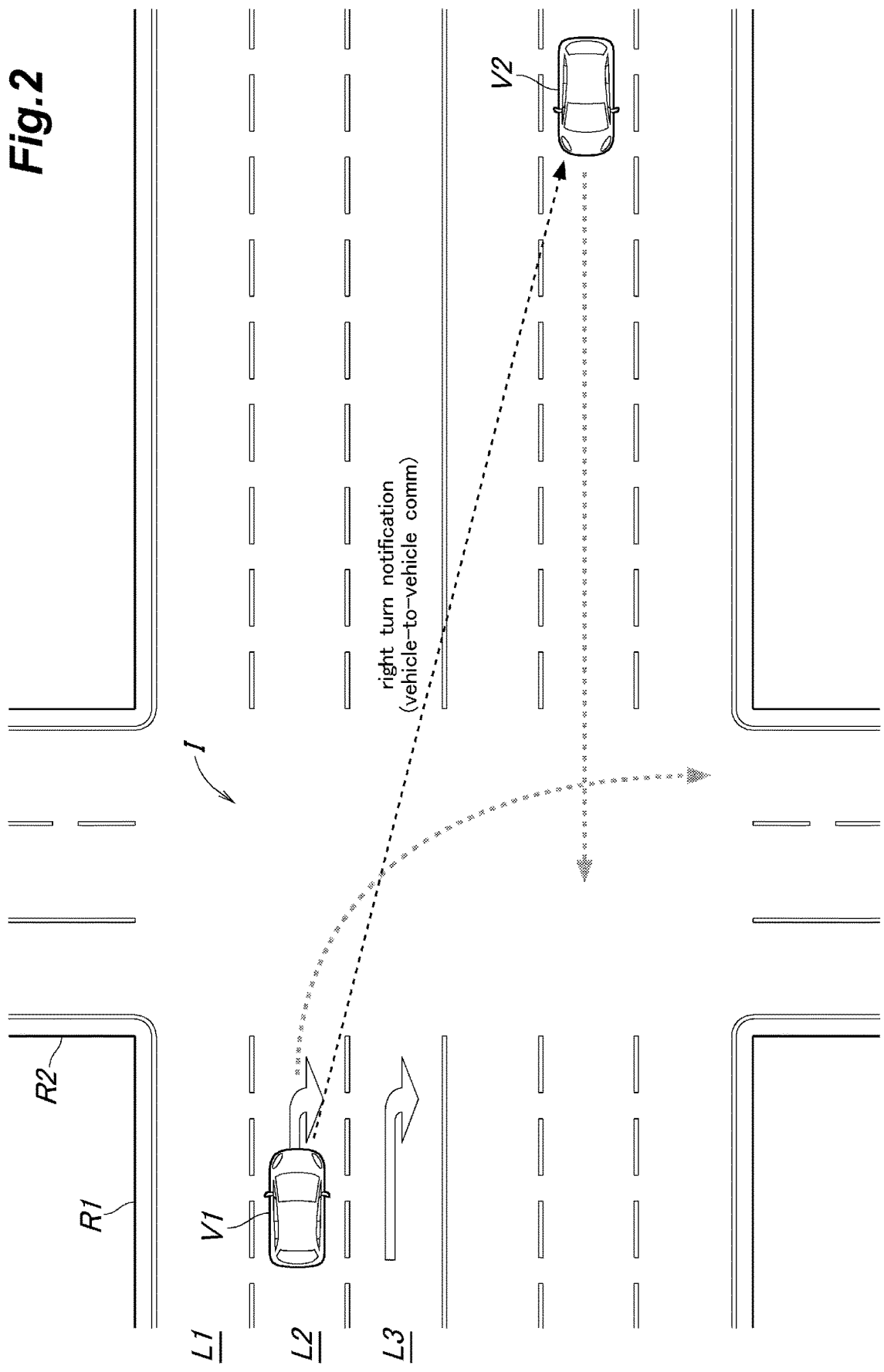
FIG. 2 is a conceptual diagram showing an outline of the vehicle control system according to the first embodiment.

FIG. 2 is a conceptual diagram showing an outline of the vehicle control system according to the first embodiment. FIG. 3 is a schematic diagram showing an example of a positional relationship between a vehicle intending to turn right and a vehicle intending to travel straight.

In the example shown in FIG. 2, first and second roads R1 and R2 intersect at an intersection I. The first road R1 has a plurality of (three) lanes L1, L2, and L3, of which two lanes L2 and L3 are set as right turn lanes (right turn dedicated lanes). Thus, the center most lane L3, a lane nearest to the center line of the road, and the lane L2 next to it are set as right turn lanes. The second road R2 has two lanes into which vehicles traveling in the two lanes L2 and L3 (right turn lanes) of the first road R1 can enter at the intersection I.

A vehicle V1 (first vehicle) intends to enter the intersection I from one direction on the first road R1 and turn right at the intersection I. A vehicle V2 (second vehicle) intends to enter the intersection I from the other direction on the first road R1 and travel straight at the intersection I.

Since the center most lane L3 is often a right turn lane, when a vehicle is traveling in the lane L3 at this intersection I, the driver of the vehicle V2 in the oncoming lane can easily recognize that the vehicle in most center lane L3 is a right-turning vehicle.

When the vehicle V2 in the oncoming lane is in a manual driving mode, the driver of the vehicle V2 is likely to mistakenly recognize the farthest right turn lane L2 (i.e., one of the right turn lanes which is farthest from the center line of the road) as a straight through lane. In such a case, the driver of the vehicle V2 may mistakenly recognize the vehicle V1 traveling in the lane L2 as a straight-through vehicle, resulting in an increase in the risk of collision. Thus, it is necessary to prevent the driver of the vehicle V2 from mistakenly recognizing the vehicle V1 in the farthest lane L2 as a straight-through vehicle.

When the vehicle V2 in the oncoming lane is in an autonomous driving mode, the control device 16 correctly recognizes the farthest lane L2 as a right turn lane and recognizes the vehicle V1 in the lane L2 as a right turn vehicle, based on the high-precision map data, more specifically, by combining a recognition result of the external environment recognizing unit 31 acquired by using the external environment sensor 7 with the high-precision map data in a coordinated fashion.

However, when the farthest lane L2 is not a right turn-only lane but a right-turnable lane; that is, a lane where a right turn is permitted in addition to permission of a straight traveling, the vehicle V2 intending to travel straight can correctly recognize the farthest lane L2 as a right-turnable lane, but cannot determine whether a vehicle in the lane L2 intends to travel straight or turn right.

In order to address this problem, when a vehicle in the autonomous driving mode travels in a right turn lane and intends to turn right at an intersection ahead based on high-precision map data, the vehicle, which is to turn right at the intersection, transmits a right turn notification to nearby vehicles using vehicle-to-vehicle communications. In addition, when a further vehicle in the autonomous driving mode receives a right turn notification from a different vehicle and intends to travel straight through an intersection ahead, the further vehicle can recognize the different vehicle in the opposite lane at the intersection ahead as a right turn vehicle and perform a predetermined control for collision avoidance with the right-turning vehicle.

In this particular embodiment, when a vehicle travels in the farthest lane of two or more right turn lanes and intends to turn right at an intersection ahead, the vehicle transmits a right turn notification that the vehicle intends to turn right from the farthest right turn lane, to nearby vehicles using vehicle-to-vehicle communications. Moreover, when a further vehicle receives a right turn notification from a different vehicle, the further vehicle recognizes the different vehicle in the farthest right turn lane of the oncoming lanes at the intersection ahead as a right turn vehicle, and performs a predetermined control for collision avoidance.

The vehicle intending to travel straight can grasp the positional relationship between the vehicle itself and a different vehicle that is the source of the right turn notification; that is, whether the vehicle itself and the different vehicle that is the source of the right turn notification are traveling in the opposite direction, the crossing direction, or the same direction, by using high-precision map data, a detection result of the external environment sensor 7, and the position data acquired by the satellite positioning device 10.

In the example shown in FIG. 3(A), the vehicle intending to turn right is located immediately before the intersection, but the vehicle intending to travel straight in the oncoming lane is relatively remote from the intersection. In this case, the vehicle intending to turn right enters the intersection before the vehicle intending to travel straight. Thus, the system controls the vehicle intending to travel straight so as not to accelerate so that the vehicle intending turn right can safely pass through the intersection first. When there is not a sufficient temporal difference between the time when the vehicle intending to turn right passes the intersection and that when the vehicle intending to travel straight passes the intersection, the system control the vehicle intending to travel straight to decelerate.

When there are two right turn lanes on the road, a vehicle in the non-center side right turn lane turns at an intersection with a larger turning radius than that in the center side right turn lane. This means that a vehicle in the non-center side right turn lane takes a longer time to turn right at the intersection than that in the center side right turn lane. Thus, when a vehicle is in the non-center side right turn lane, the system controls to change an action plan for a vehicle intending to travel straight such that the temporal difference between the time when the vehicle intending to turn right passes the intersection and that when the vehicle intending to travel straight passes the intersection is greater than cases where a vehicle is only in the center side right turn lane (for example, deceleration control).

Deceleration control of a vehicle intending to travel straight may be carried out, for example, by reducing the speed at which the vehicle travels in a constant speed traveling event. For example, when the constant speed running event is set such that a vehicle travels at the speed limit, the system may change the speed for the constant speed traveling event to a lower speed than the speed limit.

In the example shown in FIG. 3(B), the vehicle intending to turn right is located immediately before the intersection, and the vehicle intending to travel straight in the oncoming lane is also near the intersection. In this case, the vehicle intending to travel straight enters the intersection before or substantially simultaneously with the vehicle intending to turn right. Thus, the system controls the vehicle intending to turn right so as to stop until the vehicle intending to travel straight passes through the intersection so that the vehicle intending turn right can pass through the intersection after the vehicle intending to travel straight passes through the intersection.

In this case, although the vehicle intending to travel straight receives a right turn notification from the vehicle intending to turn right, it is difficult for the vehicle intending to travel straight, which is located immediately before the intersection, to handle the situation by travel control therefor. Thus, in response, the vehicle intending to travel straight transmits a response indicating the inability to handle the situation to the vehicle intending to turn right, thereby requesting the vehicle intending to turn right to carry out a proper travel control; that is, a temporary stop.

In the present embodiment, when the vehicle intending to travel straight is in the autonomous driving mode and recognizes the vehicle in the oncoming lane at the intersection ahead as a right-turning vehicle, the vehicle changes an action plan for autonomous driving of the vehicle (deceleration control) as a predetermined control for collision avoidance. However, the predetermined control for collision avoidance to be carried out is not limited to the change in an action plan.

For example, the system provides an alert to the driver as a predetermined control for collision avoidance. Specifically, the system notifies the driver of a vehicle intending to turn right in the oncoming lane by using a display image displayed on a display device (display) of the HMI 14 and an audio output from an audio device (speaker) of the HMI 14.

The predetermined control for avoiding a collision may include changing the action plan for autonomous driving of the vehicle traveling in the autonomous driving mode (deceleration control), and simultaneously with providing an alert to the driver.

Figure 4:
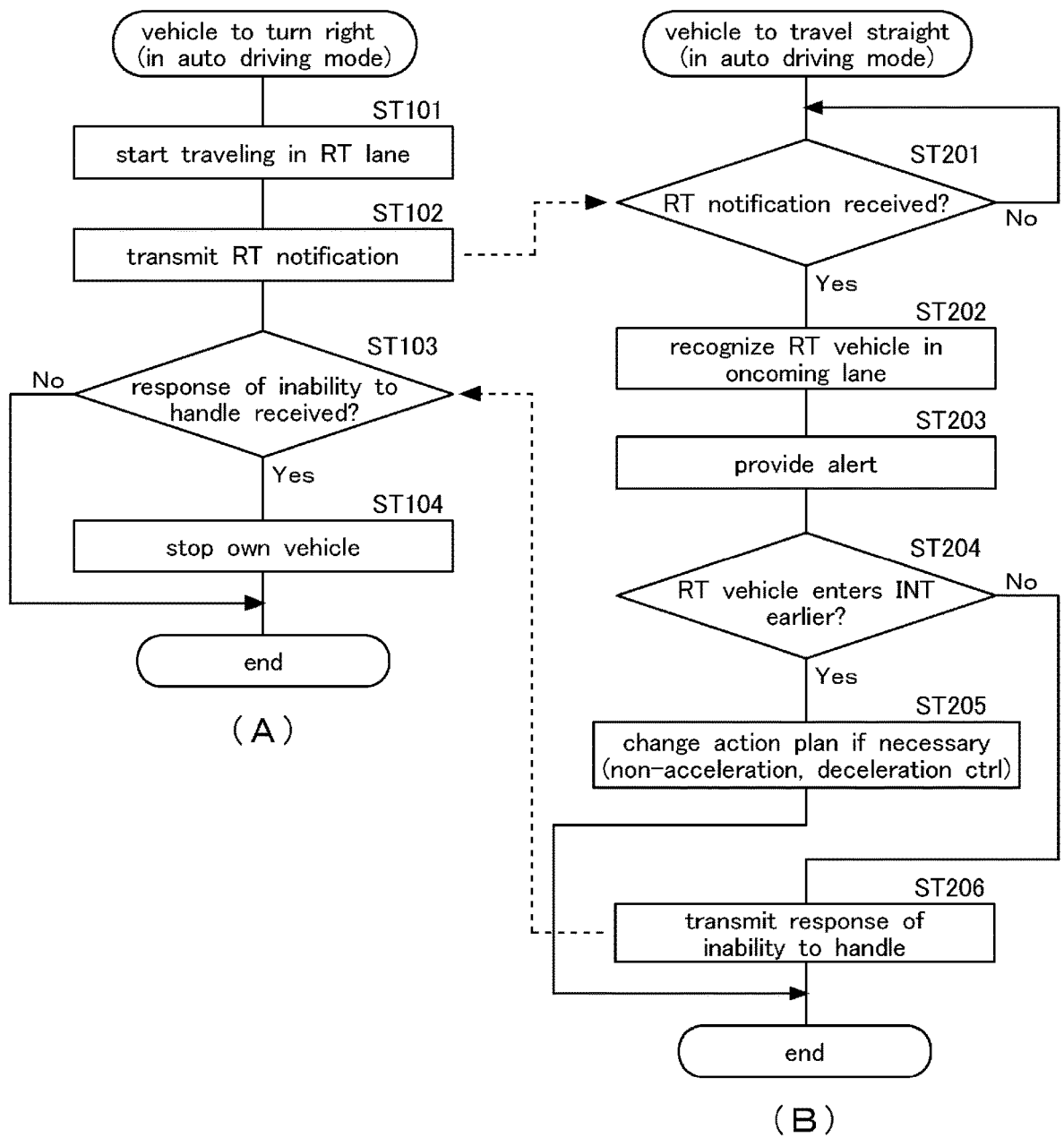
FIG. 4 is a flow chart showing an example of an operation procedure of the vehicle control system according to the first embodiment.
Figure 5:
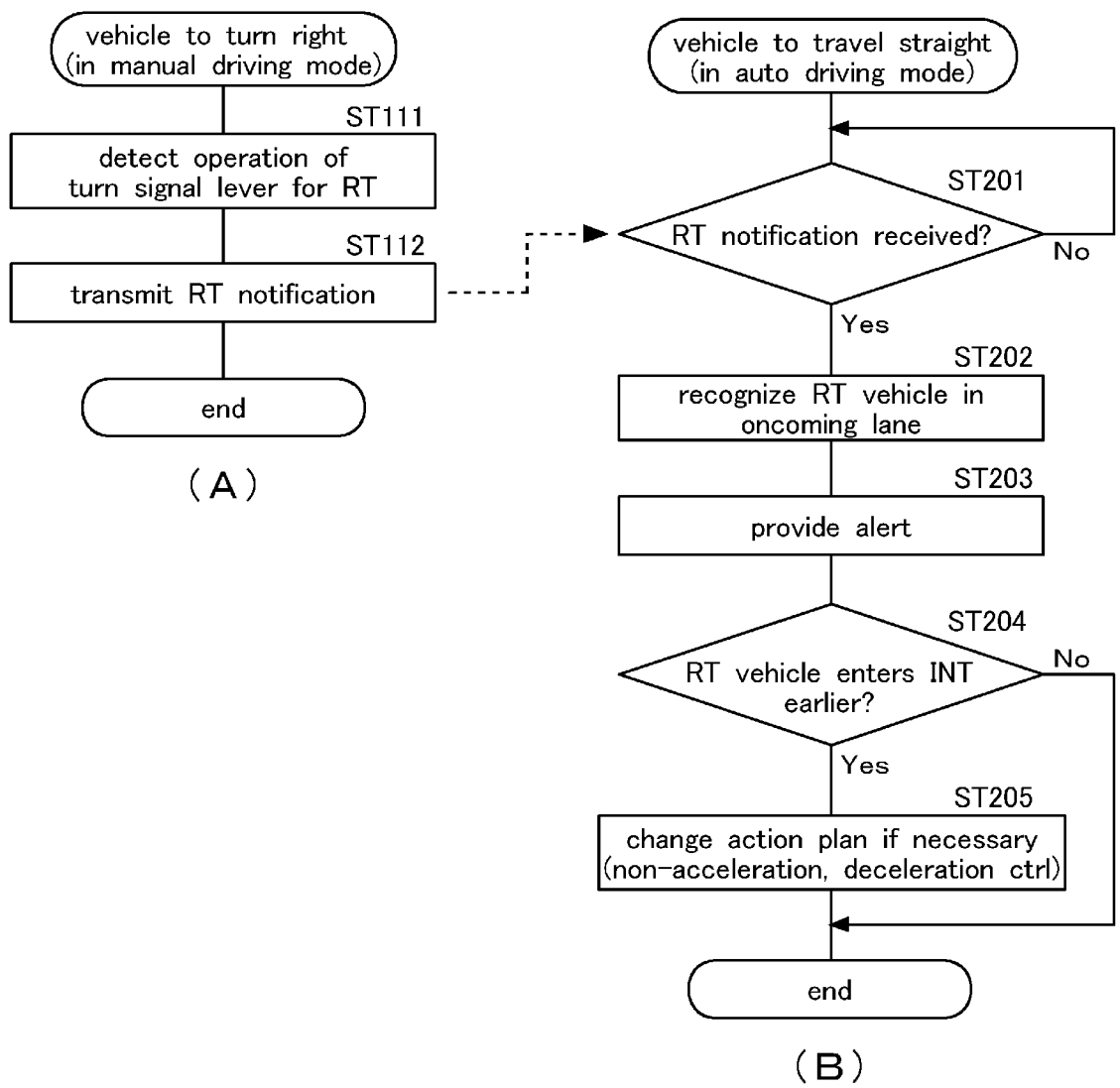
FIG. 5 is a flow chart showing an example of an operation procedure of the vehicle control system according to the first embodiment.
Figure 6:
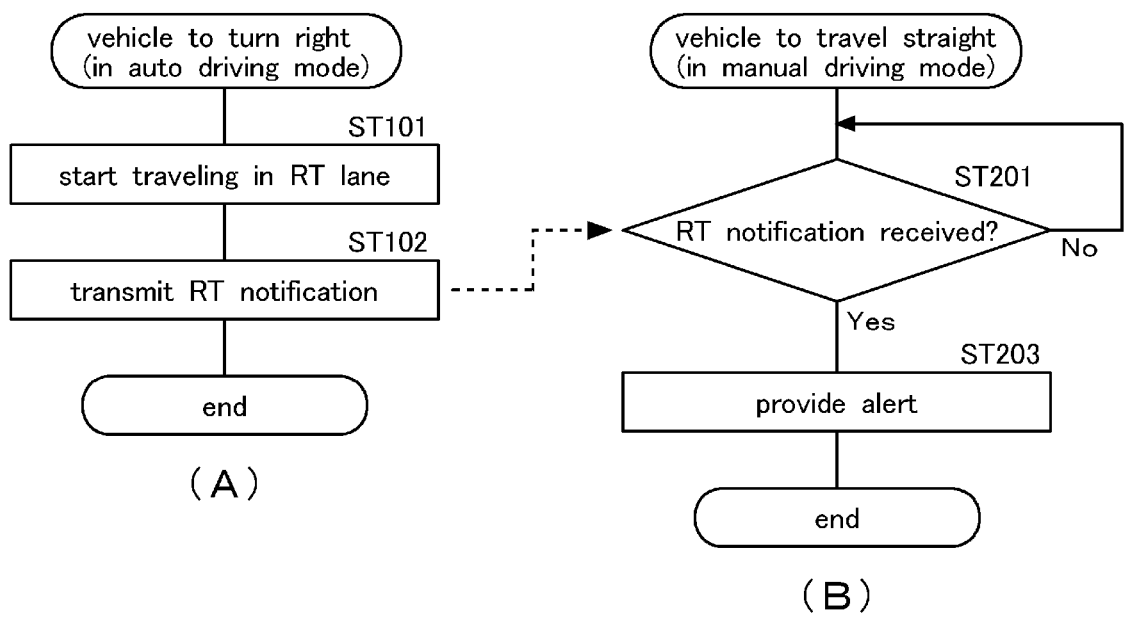
FIG. 6 is a flow chart showing an example of an operation procedure of the vehicle control system according to the first embodiment.

FIGS. 4 to 6 are flow charts showing examples of operation procedures of the vehicle control system according to the first embodiment.

The example shown in FIG. 4 is a case where the vehicle intending to turn right and the vehicle intending to travel straight are both in the autonomous driving mode.

In this case, the vehicle intending to turn right starts traveling in a right turn lane based on the intersection event of the action plan (ST101). Next, the vehicle intending to turn right transmits a right turn notification to nearby vehicles using vehicle-to-vehicle communications at a predetermined timing (ST102). For example, the vehicle intending to turn right transmits the right turn notification at the timing when the vehicle intending to turn right the intersection reaches a location at a predetermined distance from the intersection.

When the vehicle intending to travel straight receives a right turn notification from a different vehicle (Yes in ST201), the vehicle intending to travel straight recognizes the different vehicle in the oncoming lane at the intersection ahead as a right-turning vehicle based on the right turn notification, a recognition result of the external environment recognizing unit 31 using the external environment sensor 7, the high-precision map data or other information (ST202).

Next, the vehicle intending to travel straight performs a control to provide an alert to the driver using image display, or voice or sound output from the HMI 14 as a predetermined control for collision avoidance (ST203). In this way, the system can notify the driver that there exists a vehicle intending to turn right in the oncoming lane. In other cases, the vehicle intending to travel straight may provide an alert to the driver only when recognizing a different vehicle in a non-center side turn right lane as a right-turning vehicle.

Next, the vehicle intending to travel straight determines whether or not the vehicle recognized as a right-turning vehicle enters the intersection before the own vehicle (ST204). When a vehicle recognized as a right-turning vehicle enters the intersection before the own vehicle (Yes in ST204), the vehicle intending to travel straight perform a control to change the action plan upon necessary (such as non-acceleration control or deceleration control) as a predetermined control for collision avoidance (ST205). Specifically, the vehicle intending to travel straight performs control so as not to accelerate the vehicle, or when there is not a sufficient temporal difference between the time when the vehicle intending to turn right passes the intersection and that when the vehicle intending to travel straight passes the intersection, the vehicle intending to travel straight performs control so as to decelerate the vehicle.

When a vehicle recognized as a right-turning vehicle does not enter the intersection before the own vehicle; that is, the own vehicle enters the intersection before the right-turning vehicle (No in ST204), the vehicle intending to travel straight transmits a response indicating the inability to handle the situation to the vehicle intending to turn right using vehicle-to-vehicle communications (ST206).

When the vehicle intending to turn right receives the response indicating the inability to handle the situation from the vehicle intending to travel straight (Yes in ST103), the vehicle intending to turn right performs a control to stop the own vehicle (ST104). Then, when detecting that the vehicle intending to travel straight has passed the intersection, the vehicle intending to turn right starts traveling for a right turn.

The example shown in FIG. 5 is a case where the vehicle intending to turn right is in the manual driving mode and the vehicle intending to travel straight is in the autonomous driving mode.

In this case, the vehicle intending to turn right first detects the driver of the vehicle operates a turn signal lever as the external alarm device 17 to give a right turn signal (ST111). Next, the vehicle intending to turn right transmits a right turn notification indicating the intention to turn right at the intersection ahead, to nearby vehicles using vehicle-to-vehicle communications (ST112).

The operation procedures of the vehicle intending to travel straight is substantially the same as the example shown in FIG. 4(B), except that the operation procedure does not include the step of transmitting a response indicating the inability to handle the situation.

In some cases, the vehicle intending to turn right makes a right turn from the farthest right turn lane (i.e., the right turn lane which is the farthest from the center line of the road). In this case, the right turn notification the vehicle intending to travel straight receives from the vehicle intending to turn right does not include information indicating that the vehicle intending to turn right is turning right from the farthest right turn lane. Thus, the vehicle intending to travel straight recognizes the vehicle in the farthest right turn lane of the oncoming lanes at the intersection ahead as a right-turning vehicle, based on high-precision map data and a detection result of the external environment sensor 7.

The example shown in FIG. 6 is a case where the vehicle intending to turn right is in the autonomous driving mode and the vehicle intending to travel straight is in the manual driving mode.

In this case, the vehicle intending to turn right starts traveling in a right turn lane based on the intersection event of the action plan (ST101). Next, the vehicle intending to turn right transmits a right turn notification to nearby vehicles using vehicle-to-vehicle communications at a predetermined timing (ST102). The right turn notification includes information about the traveling lane in which the vehicle is traveling, in particular, when turning right from the farthest right turn lane, information indicating that the vehicle intending to turn right is making a right turn from the farthest right turn lane.

When the vehicle intending to travel straight receives a right turn notification from a different vehicle (Yes in ST201), the vehicle intending to travel straight performs a control to provide an alert to the driver as a predetermined control for collision avoidance (ST203). Specifically, the vehicle intending to travel straight notifies the driver of a right-turning vehicle in the oncoming lane at the intersection ahead by using image display, or voice or sound output from the HMI 14. In particular, when the right-turning vehicle turns right from the farthest right turn lane, the vehicle intending to travel straight notifies the driver that the right-turning vehicle is making a right turn from the farthest right turn lane.

Second Embodiment

Next, a second embodiment of the present invention will be described. Except for what will be discussed here, this embodiment is the same as the above-described embodiment.

As shown in FIG. 3(B), when the vehicle intending to travel straight enters the intersection before or substantially simultaneously with the vehicle intending to turn right, the vehicle intending turn right is controlled to pass through the intersection after the vehicle intending to travel straight passes through the intersection. In this case, when the vehicle intended to turn right is in the autonomous driving mode, the vehicle intending to turn right is controlled to stop until the vehicle intended to travel straight passes through the intersection, and when the vehicle intended to turn right is in the manual driving mode, the driver of the vehicle intending to turn right stops the vehicle until the vehicle intended to travel straight passes through the intersection.

In some cases, while the vehicle intending to travel straight is traveling straight at the intersection as planned, the vehicle intending to turn right, which has entered the intersection, moves forward without stopping or starts moving forward after having stopped once in the intersection. In such cases, it is assumed that the vehicle intending to turn right is making a dangerous right turn before the vehicle intending to travel straight enters the intersection, which incurs an increased risk of collision.

Thus, in the present embodiment, in cases where a vehicle intending to travel straight recognizes a vehicle in the oncoming lane at the intersection ahead as a right-turning vehicle and the vehicle is expected to enter the intersection prior to the right-turning vehicle, when detecting that the vehicle recognized as a right-turning vehicle is moving in the intersection ahead, the vehicle intending to travel straight performs control to decelerate the own vehicle as a predetermined control for collision avoidance, which can reduce the risk of collision.

In the present embodiment, a vehicle intending to travel straight can determine in advance whether a vehicle in the oncoming lane intends to travel straight or turn right based on a right turn notification from a vehicle intending to turn right in the same manner as the first embodiment. Thus, in cases where a different vehicle in the oncoming lane is a straight-through vehicle, even when the different vehicle in the oncoming lane suddenly starts moving due to a green traffic signal or the start of a front vehicle in a traffic congestion, the vehicle intending to travel straight does not perform a control for collision avoidance (deceleration control).

In some cases, the control of the vehicle intending to travel straight may be changed depending on the level of danger of the vehicle intending to turn right. For example, when the moving speed of the vehicle intending to turn right is high, the vehicle intending to travel straight may perform sudden braking control to avoid danger. In other cases, when there is a sufficient temporal difference between the time when the vehicle intending to turn right passes the intersection and that when the vehicle intending to travel straight passes the intersection, the vehicle intending to travel straight may not perform a deceleration control.

A vehicle intending to travel straight can detect the movement of the right-turning vehicle in the intersection by the recognizing operation of the external environment recognizing unit 31 based on a detection result of the external environment sensor 7, such as a radar, a lidar, a sonar, or an external camera. In addition, although a vehicle intending to travel straight cannot determine whether a vehicle in the oncoming lane is traveling straight or turning right based on a slight movement of the vehicle, a preliminary notification indicating that the vehicle intends to turn right enables the vehicle intending to travel straight to recognize that a slight movement of the vehicle is the start of a right turn.

In other embodiments, a vehicle intending to turn right may detect that the own vehicle has moved within an intersection and notify nearby vehicles of the detection result using vehicle-to-vehicle communications. In this case, the vehicle intending to travel straight can easily recognize that the vehicle intending to turn right has moved within the intersection.

FIG. 7 is a flow chart showing an example of an operation procedure of the vehicle control system 1 according to the second embodiment.

As shown in FIG. 7(A), the operation procedure of a vehicle intending to turn right is the same as that of the first embodiment (see FIG. 4(A)).

As shown in FIG. 7(B), the operation procedure of a vehicle intending to travel straight is the same as that of the first embodiment (see FIG. 4(B)) from the step of receiving a right turn notification from a different vehicle (Yes in ST201) to the step of determining whether or not the vehicle recognized as a right-turning vehicle enters the intersection before the own vehicle (ST204).

When a vehicle recognized as a right-turning vehicle enters the intersection before the own vehicle (Yes in ST204), the vehicle intending to travel straight perform a control for collision avoidance to change the action plan upon necessary (such as non-acceleration control or deceleration control) (ST205). Specifically, the vehicle intending to travel straight performs control so as not to accelerate the vehicle, or when there is not a sufficient temporally difference between the time when the vehicle intending to turn right passes the intersection and that when the vehicle intending to travel straight passes the intersection, the vehicle intending to travel straight performs control so as to decelerate the vehicle.

When a vehicle recognized as a right-turning vehicle does not enter the intersection before the own vehicle; that is, the own vehicle enters the intersection before the right-turning vehicle (No in ST204), the vehicle intending to travel straight determines whether or not the vehicle recognized as a right-turning vehicle is moving in the intersection ahead (ST211). When determining that the vehicle recognized as a right-turning vehicle moves in the intersection (Yes in ST211), the vehicle intending to travel straight performs a deceleration control as a control for collision avoidance (ST212).

In this case, the control for avoiding a collision may include decelerating the own vehicle, and simultaneously with providing an alert (a high level alert) to the driver.

In the example shown in FIG. 7, the vehicle intending to turn right and the vehicle intending to travel straight are both in the autonomous driving mode. However, in some cases, the vehicle intending to turn right is in the manual driving mode, whereas the vehicle intending to travel straight is in the autonomous driving mode. In such cases, the operation procedure of the vehicle intending to turn right is the same as that in the example shown in FIG. 5(A). The operation procedure of the vehicle intending to travel straight does not include the step of transmitting a response indicating the inability to handle the situation as in FIG. 5(B).

The above-described embodiments have been described with reference to cases where vehicles are driving on the left side of the road. Thus, in cases where vehicles are driving on the right side of the road, each right turn in the description shall be replaced with a left turn. Specifically, when a vehicle turns on another road at an intersection, the vehicle makes a turn with crossing or without crossing the oncoming lane. In the case of crossing the oncoming lane, there arises a risk of collision with a vehicle traveling in the oncoming lane. In cases where vehicle are driving on the right side of the road, a risk of collision at an intersection occurs between a vehicle intending to turn left and a vehicle intending to travel straight on the oncoming lane.

Glossary 1 vehicle control system
2 vehicle system
3 map server (server device)
16 control device
Va vehicle intending to turn right (first vehicle)
Vb vehicle intending to travel straight (second vehicle)

The invention claimed is:

1. A vehicle control system for avoiding a collision between a right-turning vehicle and a straight-through vehicle,
wherein a first vehicle retains high-precision map data used to identify a lane in which the first vehicle is traveling, and wherein, when the first vehicle is in an autonomous driving mode and intends to travel in a right turn lane and turn right at an intersection ahead based on the high-precision map data, the first vehicle transmits a right turn notification indicating the intention to turn right, to one or more nearby vehicles using vehicle-to-vehicle communications;
wherein, when there are multiple right turn lanes and the first vehicle intends to travel in a farthest right turn lane and turn right at the intersection ahead, the farthest right turn lane being one of the multiple right turn lanes which is farthest from the center of a road, the first vehicle transmits the right turn notification indicating the intention to turn right from the farthest right turn lane; and
wherein a second vehicle, which is one of the nearby vehicles, retains high-precision map data used to identify a lane in which the second vehicle is traveling, and wherein, when the second vehicle is in an autonomous driving mode and intends to travel straight at the intersection ahead, the second vehicle recognizes the first vehicle in an oncoming lane at the intersection as a right-turning vehicle upon receiving the right turn notification from the first vehicle, and performs a predetermined control for collision avoidance with the right-turning vehicle.

2. The vehicle control system according to claim 1, wherein, in a case where the second vehicle recognizes the first vehicle in the oncoming lane at the intersection ahead as a right-turning vehicle and the second vehicle is expected to pass through the intersection before the right-turning vehicle, when detecting that the right-turning vehicle has moved in the intersection, the second vehicle performs the predetermined control for collision avoidance with the right-turning vehicle.

3. The vehicle control system according to claim 1, wherein the second vehicle performs the predetermined control for collision avoidance by changing an action plan for autonomous driving of the second vehicle.

4. The vehicle control system according to claim 1, wherein the second vehicle performs a control for providing an alert to an occupant as the predetermined control for collision avoidance.

5. The vehicle control system according to claim 1, wherein the second vehicle performs a deceleration control such that a temporal difference between a time when the first vehicle passes the intersection and a time when the second vehicle passes the intersection is greater in a case where the first vehicle is in the farthest right turn lane than in a case where the first vehicle is in a nearest right turn lane which is nearest from the center of the road.

6. The vehicle control system according to claim 5, wherein, the second vehicle performs the deceleration control by changing a speed for constant speed driving to a lower speed.

7. The vehicle control system according to claim 1, wherein, when the second vehicle enters the intersection before or substantially simultaneously with the first vehicle, the first vehicle is controlled to stop until the second vehicle passes through the intersection so that the first vehicle can pass through the intersection after the second vehicle passes through the intersection.

* * * * *